United States Patent
Sugaya

(10) Patent No.: US 10,212,177 B2
(45) Date of Patent: Feb. 19, 2019

(54) SYSTEM AND METHOD FOR MANAGING TERMINAL

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 95 days.

(21) Appl. No.: 15/000,102

(22) Filed: Jan. 19, 2016

(65) Prior Publication Data

US 2017/0126721 A1    May 4, 2017

(30) Foreign Application Priority Data

Oct. 28, 2015  (JP) ................. 2015-212388

(51) Int. Cl.
*H04L 29/06* (2006.01)
*H04L 29/08* (2006.01)
*H04W 12/12* (2009.01)

(52) U.S. Cl.
CPC ........ *H04L 63/1425* (2013.01); *H04L 63/168* (2013.01); *H04L 67/02* (2013.01); *H04L 67/04* (2013.01); *H04L 67/125* (2013.01); *H04L 67/146* (2013.01); *H04L 67/34* (2013.01); *H04W 12/12* (2013.01)

(58) Field of Classification Search
CPC ... H04L 63/1425; H04L 63/168; H04L 67/02; H04L 67/146; H04L 67/04; H04L 67/125; H04L 67/34; H04W 12/12
See application file for complete search history.

(56) References Cited

U.S. PATENT DOCUMENTS

| | | | | |
|---|---|---|---|---|
| 9,178,901 | B2* | 11/2015 | Xue | H04L 63/1483 |
| 2007/0208699 | A1* | 9/2007 | Uetabira | G06F 17/30699 |
| 2012/0094643 | A1* | 4/2012 | Brisebois | H04W 8/245 |
| | | | | 455/418 |
| 2012/0253662 | A1* | 10/2012 | Iguchi | G01C 21/3697 |
| | | | | 701/428 |
| 2015/0381643 | A1* | 12/2015 | Shin | H04L 63/1483 |
| | | | | 726/22 |
| 2016/0055327 | A1* | 2/2016 | Moran | G06F 21/32 |
| | | | | 726/19 |
| 2016/0162275 | A1* | 6/2016 | Morley | G06F 8/65 |
| | | | | 717/170 |

FOREIGN PATENT DOCUMENTS

JP      2012-185745      9/2012

* cited by examiner

*Primary Examiner* — Ghodrat Jamshidi
(74) *Attorney, Agent, or Firm* — Lex IP Meister, PLLC

(57) ABSTRACT

The present invention is to provide a system and a method for managing a terminal to improve the security. The system for managing a terminal 1 connects to a WEB content containing information on an application running on the terminal; calculates reliability of the WEB content; references data on an application in the WEB content if the calculated reliability exceeds a threshold; and performs control of the application for the terminal based on a result of the reference.

8 Claims, 13 Drawing Sheets

Fig. 13

RELIABILITY TABLE

| | |
|---|---|
| Provider name | Company A |
| | Store A |
| | Play A |
| URL | http://aaa.com |
| | http://bbb.com |
| | http://ccc.com |

SYSTEM AND METHOD FOR MANAGING TERMINAL

CROSS REFERENCE TO RELATED APPLICATIONS

This application claims priority to Japanese Patent Application No. 2015-212388 filed on Oct. 28, 2015, the entire contents of which are incorporated by reference herein.

TECHNICAL FIELD

This invention relates to a system and a method for managing a terminal.

Recently, content servers have provide applications through web pages on the Internet, etc., to install applications in sophisticated mobile terminals such as smart phones and tablet terminals. In such application providing service, users can freely select and install necessary applications in their mobile terminals.

Such applications may include applications causing information leaks or unauthorized access to mobile terminals and applications developed by using development tools that hide malware (called xcode ghost, etc.).

A constitution to prevent users from executing such applications is disclosed, in which information on reliable applications is stored in a whitelist, and the applications that users have installed are removed from mobile terminals if not conforming with any information stored in this whitelist (for example, refer to Patent Document 1).

CITATION LIST

Patent Literature

Patent Document 1; JP 2012-185745 A

SUMMARY OF INVENTION

According to the constitution of Patent Document 1, the names, the version information, and the developer's information of reliable applications are stored in a whitelist; the version information, and the developer's information of an installed application are compared with those stored in this whitelist; and the installed application is uninstalled if any of these do not conform with those stored in this whitelist, so as to improve the security of a mobile terminal.

However, the constitution described in Patent Document 1 can improve the security against the actually installed applications but hardly improves the security when downloading or updating applications and when accessing to WEB contents provided from third persons different from providers who provide the applications.

Therefore, the present invention focuses on the improvement of the security by evaluating the reliability of WEB contents containing information on applications and of applications and by performing control of applications.

An objective of the present invention is to provide a system and a method for managing a terminal to improve the security.

According to the first aspect of the present invention, a system for managing a terminal includes:

a connection unit that connects to a WEB content containing information on an application running on the terminal;

a calculation unit that calculates reliability of the WEB content;

a reference unit that references data on an application in the WEB content if the calculated reliability exceeds a threshold; and a control unit that performs control of the application for the terminal based on a result of the reference.

According to the first aspect of the present invention, a system for managing a terminal connects to a WEB content containing information on an application running on the terminal; calculates reliability of the WEB content; references data on an application in the WEB content if the calculated reliability exceeds a threshold; and performs control of the application for the terminal based on a result of the reference.

The first aspect of the present invention falls into the category of a system for managing a terminal, but the categories of a method, etc., for managing a terminal have the same functions and effects.

According to the second aspect of the present invention, in the system according to the first aspect of the present invention, the calculation unit calculates reliability from a provider who provides the WEB content.

According to the second aspect of the present invention, the system according to the first aspect of the present invention calculates reliability from a provider who provides the WEB content.

According to the third aspect of the present invention, in the system according to the first or the second aspect of the present invention, the calculation unit calculates reliability from a URL of the WEB content.

According to the third aspect of the present invention, the system according to the first or the second aspect of the present invention calculates reliability from a URL of the WEB content.

According to the fourth aspect of the present invention, in the system according to any one of the first to the third aspects of the present invention, the control unit performs download control of the application.

According to the fourth aspect of the present invention, the system according to any one of the first to the third aspects of the present invention performs download control of the application.

According to the fifth aspect of the present invention, in the system according to any one of the first to the fourth aspects of the present invention, the control unit performs installation control of the application.

According to the fifth aspect of the present invention, the system according to any one of the first to the fourth aspects of the present invention performs installation control of the application.

According to the sixth aspect of the present invention, in the system according to any one of the first to the fifth aspects of the present invention, the control unit performs start-up control of the application.

According to the sixth aspect of the present invention, the system according to any one of the first to the fifth aspects of the present invention performs start-up control of the application.

According to the seventh aspect of the present invention, in the system according to any one of the first to the sixth aspects of the present invention, the control unit uninstalls the application.

According to the seventh aspect of the present invention, the system according to any one of the first to the sixth aspects of the present invention uninstalls the application.

According to the eighth aspect of the present invention, the system according to any one of the first to the seventh aspects of the present invention further includes:

a confirmation unit that confirms whether or not the application is safe when the application is updated; and a removal unit that removes the application from a subject for the control if the safety is not confirmed.

According to the eighth aspect of the present invention, the system according to any one of the first to the seventh aspects of the present invention controls download of the application; confirms whether or not the application is safe when the application is updated; and removes the application from a subject for the control if the safety is not confirmed.

According to the ninth aspect of the present invention, the system according to any one of the first to the eighth aspects of the present invention further includes:

a collection unit that collects information from a plurality of the connected WEB contents; and a checking unit that checks whether or not the collected information includes information on a same application.

According to the ninth aspect of the present invention, the system according to any one of the first to the eighth aspects of the present invention collects information from a plurality of the connected WEB contents; and checks whether or not the collected information includes information on a same application.

According to the tenth aspect of the present invention, a method for managing a terminal includes the steps of connecting to a WEB content containing information on an application running on the terminal;

calculating reliability of the WEB content;

referencing data on an application in the WEB content if the calculated reliability exceeds a threshold; and performing control of the application for the terminal based on a result of the reference.

The present invention can provide a system and a method for managing a terminal to improve the security.

BRIEF DESCRIPTION OF DRAWINGS

FIG. 13 illustrates a reliability table.

DESCRIPTION OF EMBODIMENTS

Embodiments of the present invention will be described below with reference to the attached drawings. However, this is illustrative only, and the scope of the present invention is not limited thereto.

System for Managing Terminal 1 According to First Embodiment

Figure 1:
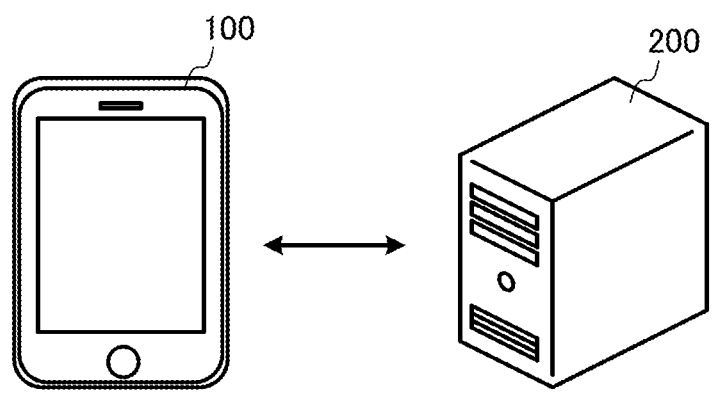
FIG. 1 is a conceptual diagram of the system for managing a terminal 1 according to the first embodiment.
Figure 2:
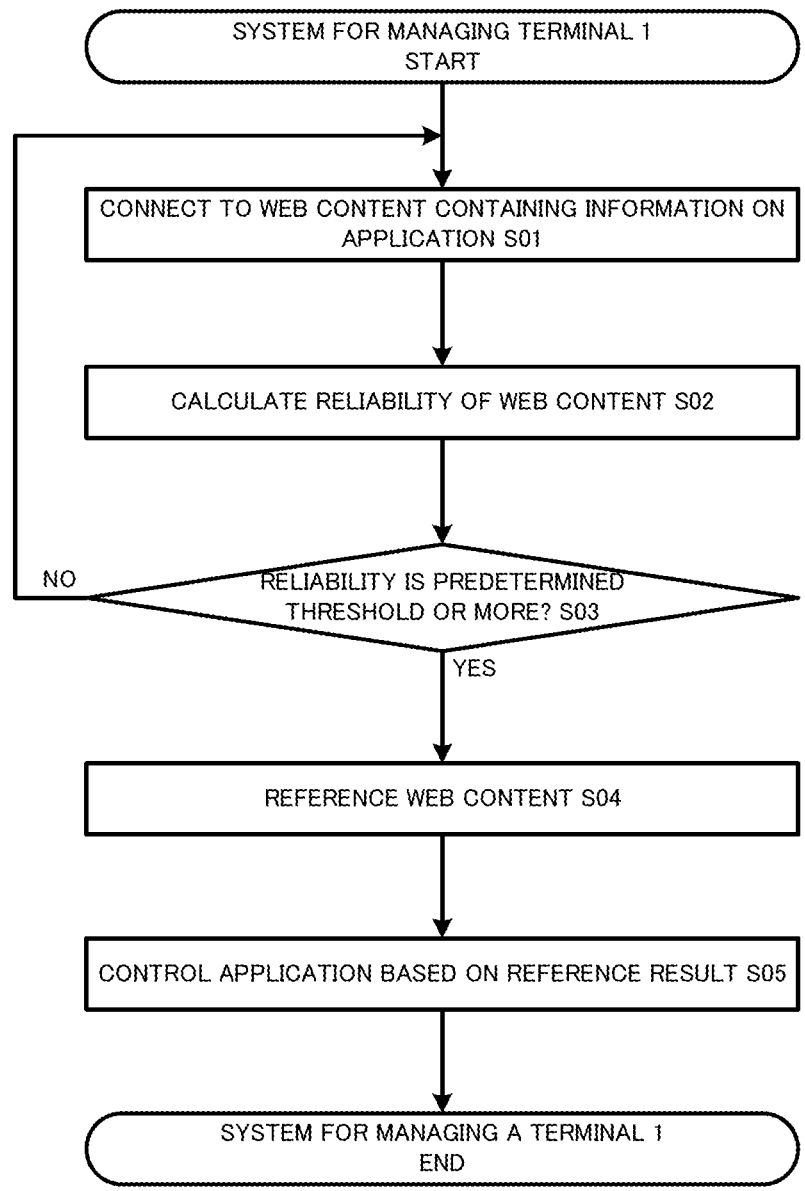
FIG. 2 is a schematic flow chart of the system for managing a terminal 1 according to the first embodiment.

The first embodiment of the present invention will be described below with reference to FIGS. 1 and 2. FIG. 1 is the conceptual diagram of the system for managing a terminal 1 according to the first embodiment. FIG. 2 is the schematic flow chart of the terminal management process performed by the system for managing a terminal 1 according to the first embodiment.

The system for managing a terminal 1 includes a mobile terminal 100 and a content server 200. The number of the content server 200 is not be limited to one and may be more than one. Furthermore, the number of the mobile terminal 100 is not be limited to one and may be more than one.

The user terminal 100 is a home or an office appliance with a data communication function and a capability of downloading or installing an application and a WEB content containing a text and an image from the content server 200. Examples of the mobile terminal 100 include information appliances such as a mobile phone, a mobile terminal, a personal computer, a net book terminal, a slate terminal, an electronic book terminal, and a portable music player. The mobile terminal 100 may be a stationary terminal.

The content server 200 is a server device with a data communication function and a capability of transmitting a predetermined application and a WEB content containing a text and an image based on access from the mobile terminal 100.

First, the mobile terminal 100 connects to the content server 200 that has a WEB content containing information on an application running on the mobile terminal 100 itself to acquire the WEB content (step S01). In the step S01, the mobile terminal 100 acquires an WEB content including information on an application installed in the mobile terminal 100 itself or information on an application that a user specifies.

The mobile terminal 100 calculates reliability of the acquired WEB content (step S02). In the step S02, the mobile terminal 100 calculates the reliability based on the content information including the provider name, the URL, and the description of the acquired WEB content. Specifically, the mobile terminal 100 previously stores the content information including a reliable provider name, URL, and description in a reliability table; references each data included the content information of the acquired WEB content, which is stored in the reliability table; and increments the reliability every content information of the application to calculate the total if the content information acquired this time exists in the reliability table. For example, if the provider name of the acquired WEB content is stored in the reliability table, the mobile terminal 100 increments the reliability by 1. Furthermore, if the URL of the acquired WEB content is stored in the reliability table, the mobile terminal 100 increments the reliability by 1. Yet furthermore, if the description of the acquired WEB content is stored in the reliability table, the mobile terminal 100 increments the reliability by 1.

The mobile terminal 100 judges whether or not the reliability calculated in the step S02 is a predetermined threshold or more (step S03). In the step S03, if judging that the calculated reliability is not a predetermined threshold or more (NO), the mobile terminal 100 connects to a WEB content different from the WEB content connected in the step S01 or reconnects to the WEB content connected in the step S01.

On the other hand, if judging that the calculated reliability is a predetermined threshold or more (YES) in the step S03, the mobile terminal 100 references the WEB content (step S04). In the step S04, the mobile terminal 100 references data on an application in the WEB content.

In the step S04, the mobile terminal 100 references data necessary for download, installation, uninstallation, and update of the application.

The mobile terminal 100 performs control of the application based on a result of the reference (step S05). In the step S05, the control of the application that the mobile terminal 100 includes download, installation, uninstallation, and update; and start-up control of an installed application. The mobile terminal 100 references an application list in the WEB content and performs download or installation control of this application. Furthermore, the mobile terminal 100 references an application list in the WEB content and performs uninstallation control of this application. Yet furthermore, the mobile terminal 100 references data on an application list in the WEB content and performs start-up or stop control of an application. The data on an application in a WEB content are, for example, resulted from the analysis of the characters described in the WEB content, which are key words such as an application name, "malware has been found", "malware invades", and "download".

System for Managing Terminal 1 According to Second Embodiment

Figure 3:
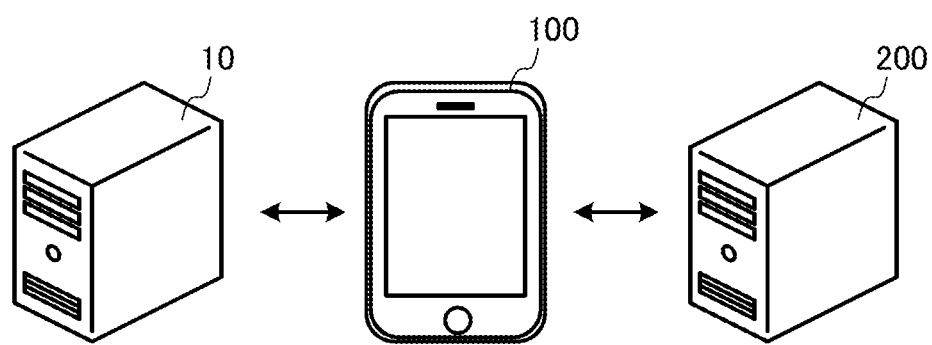
FIG. 3 is a conceptual diagram of the system for managing a terminal 1 according to the second embodiment.
Figure 4:
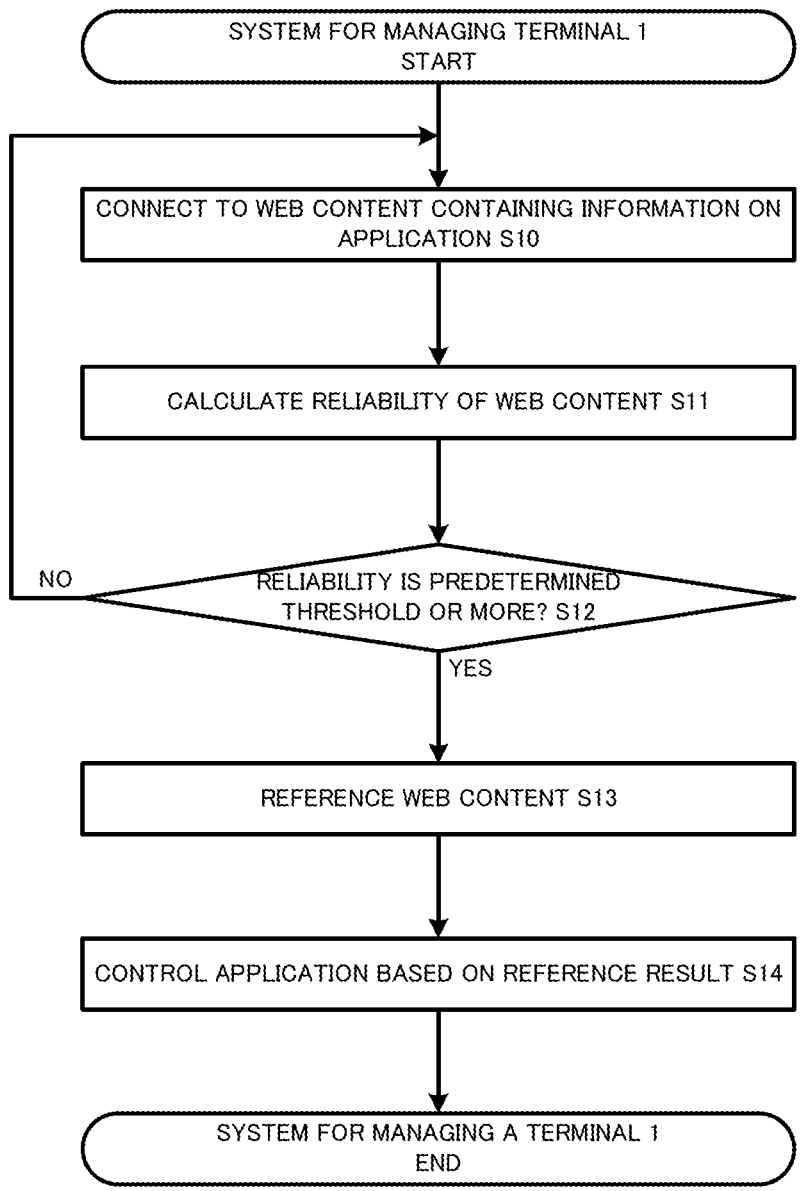
FIG. 4 is a schematic flow chart of the system for managing a terminal 1 according to the second embodiment.

The second embodiment of the present invention will be described below with reference to FIGS. 3 and 4. FIG. 3 is the conceptual diagram of the system for managing a terminal 1 according to the second embodiment. FIG. 4 is the schematic flow chart of the terminal management process performed by the system for managing a terminal 1 according to the second embodiment.

The system for managing a terminal 1 includes a management server 10, a mobile terminal 100, and a content server 200. The number of the content server 200 is not be limited to one and may be more than one. Furthermore, the number of the mobile terminal 100 is not be limited to one and may be more than one.

The mobile terminal 100 is an electrical appliance similar to those in the first embodiment, which is an information appliance.

The content server 200 is a server device similar to that in the first embodiment.

The management server 10 is a server device that has a data communication function and a capability of calculating the reliability of a content based on an inquiry from the mobile terminal 100.

First, the mobile terminal 100 acquires a WEB content in the same way as the first embodiment (step S10).

The mobile terminal 100 transmits the acquired WEB content to the management server 10. The management server 10 receives the WEB content transmitted from the mobile terminal 100 and calculates reliability of the WEB content (step S11). In the step S11, the management server 10 may receive only a WEB content itself or data such as a provider name, a URL, and a description of a WEB content.

In the step S11, the management server 10 calculates the reliability of a WEB content in the same way as the step S02 in the first embodiment. The management server 10 calculates the reliability based on the content information including the provider name, the URL, and the description of a WEB content. Specifically, the management server 10 previously stores the content information including a reliable provider name, URL, and description in a reliability table; references each data included the content information of the acquired WEB content, which is stored in the reliability table; and increments the reliability every content information of the application to calculate the total if the content information acquired this time exists in the reliability table. For example, if the provider name of the acquired WEB content is stored in the reliability table, the management server 10 increments the reliability by 1. Furthermore, if the URL of the acquired WEB content is stored in the reliability table, the management server 10 increments the reliability by 1. Yet furthermore, if the description of the acquired WEB content is stored in the reliability table, the management server 10 increments the reliability by 1.

The management server 10 judges whether or not the reliability calculated in the step S11 is a predetermined threshold or more (step S12). In the step S12, if judging that the calculated reliability is not a predetermined threshold or more (NO), the management server 10 transmits an instruction to the mobile terminal 100 to connect to another WEB content or to transmit the WEB content again.

On the other hand, if judging that the calculated reliability is a predetermined threshold or more (YES) in the step S12, the management server 10 notifies the mobile terminal 100 of this judgement, and the mobile terminal 100 references the WEB content (step S13). In the step S13, the mobile terminal 100 references data on an application in the WEB content.

In the step S13, the mobile terminal 100 references data necessary for download, installation, uninstallation, and update of the application.

The mobile terminal 100 performs control of the application based on a result of the reference (step S14). In the step S14, the control of the application that the mobile terminal 100 includes download, installation, uninstallation, and update; and start-up control of an installed application.

Figure 5:
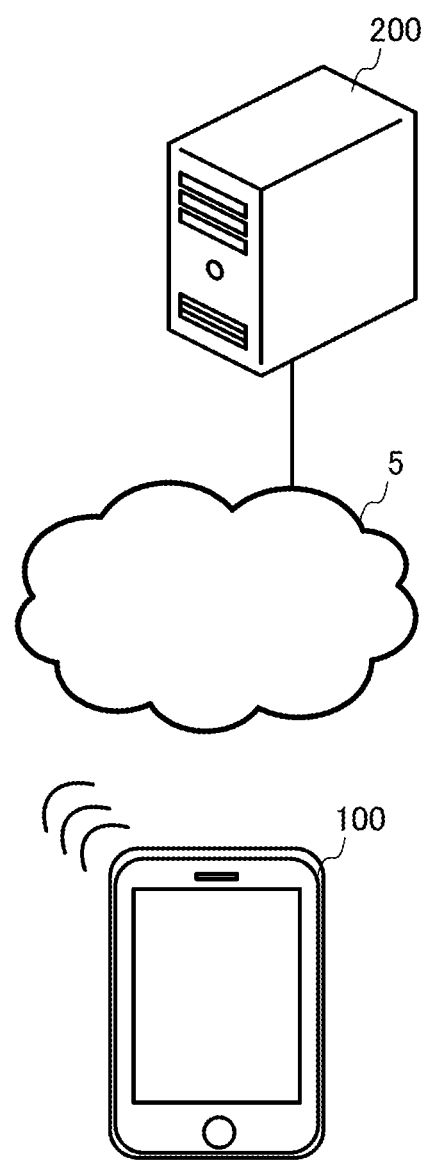
FIG. 5 is an overall configuration diagram of the system for managing a terminal 1 according to the first embodiment.

System Configuration of System for Managing Terminal 1 According to First Embodiment FIG. 5 shows the system configuration of the system for managing a terminal 1 according to the first embodiment of the present invention. The system for managing a terminal 1 includes a terminal 100, a content server 200, and a public line network 5 (e.g. the Internet network, a third and a fourth generation networks).

The mobile terminal 100 has functions to be described later and a capability of data communication, which is an appliance described above.

Examples of the mobile terminal 100 include information appliances such as a mobile phone, a mobile terminal, a net book terminal, a slate terminal, an electronic book terminal, and a portable music player.

The content server 200 has functions to be described later and a capability of data communication, which is a server device to provide an application and various data to the mobile terminal 100.

Functions

Figure 7:
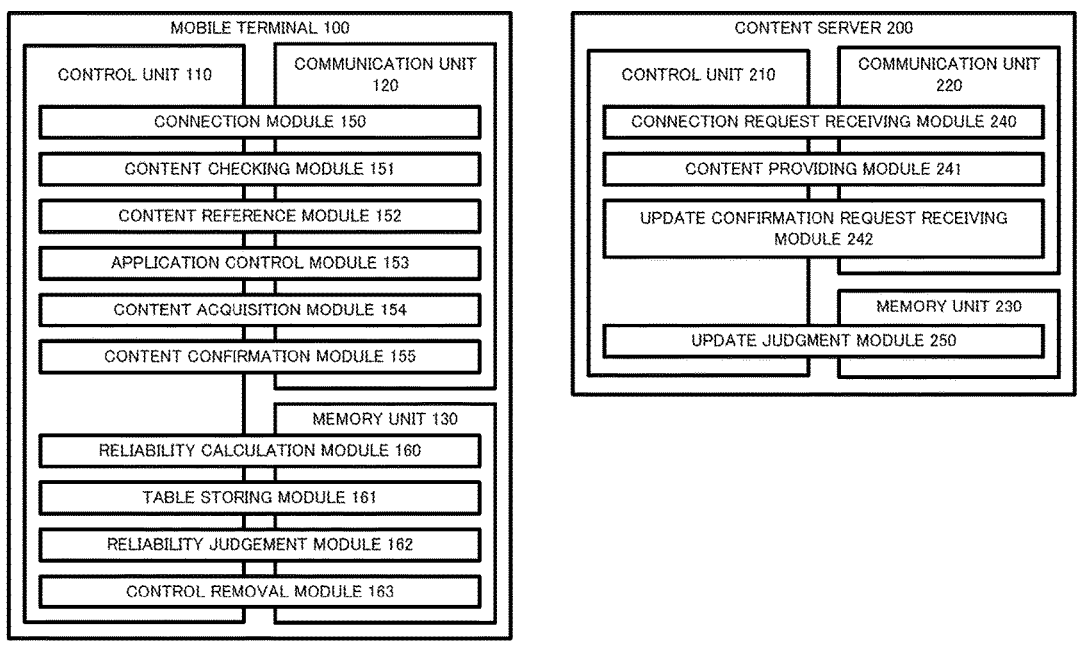
FIG. 7 is a functional block diagram of the mobile terminal 100 and the content server 200 in the first embodiment.

The structure of each device will be described below with reference to FIG. 7.

The mobile terminal 100 may include a control unit 110 such as a central processing unit (hereinafter referred to as "CPU"), random access memory (hereinafter referred to as "RAM"), and read only memory (hereinafter referred to as "ROM") and a communication unit 120 such as a device capable of communicating with other devices, for example a Wireless Fidelity or Wi-Fi® enabled device complying with IEEE 802.11.

The mobile terminal 100 also includes a memory unit 130 such as a hard disk, a semiconductor memory, a recording medium, or a memory card to store data. The memory unit 130 includes a reliability database to be described later. The mobile terminal 100 also includes an input-output unit including a display unit outputting and displaying data and images that have been processed by the control unit 110; and an input unit such as a touch panel, a keyboard, or a mouse that receive an input from a user. The mobile terminal 100 also includes a device capable of acquiring location information, such as a GPS.

In the mobile terminal 100, the control unit 110 reads a predetermined program to run a connection module 150, a content checking module 151, a content reference module 152, an application control module 153, a content acquisition module 154, and a content confirmation module 155 in cooperation with the communication unit 120. In the mobile terminal 100, the control unit 110 reads a predetermined program to run a reliability calculation module 160, a table storing module 161, a reliability judgement module 162, and a control removal module 163 in cooperation with the memory unit 130.

The content server 200 includes a control unit 210 including a CPU, a RAM, and a ROM; and a communication unit 220 including a Wireless Fidelity or Wi-Fi® enabled device complying with, for example, IEEE 802.11 enabling the communication with other devices in the same way as the mobile terminal 100.

The content server 200 also includes a storage unit as the memory unit 230 in the same way as the mobile terminal 100.

In the content server 200, a control unit 210 reads a predetermined program to run a connection request receiving module 240, a content providing module 241, and an update confirmation request receiving module 242 in cooperation with a communication unit 220. In the content server 200, the control unit 210 reads a predetermined program to run an update judgment module 250 in cooperation with the memory unit 230.

Terminal Management Process in First Embodiment

Figure 9:
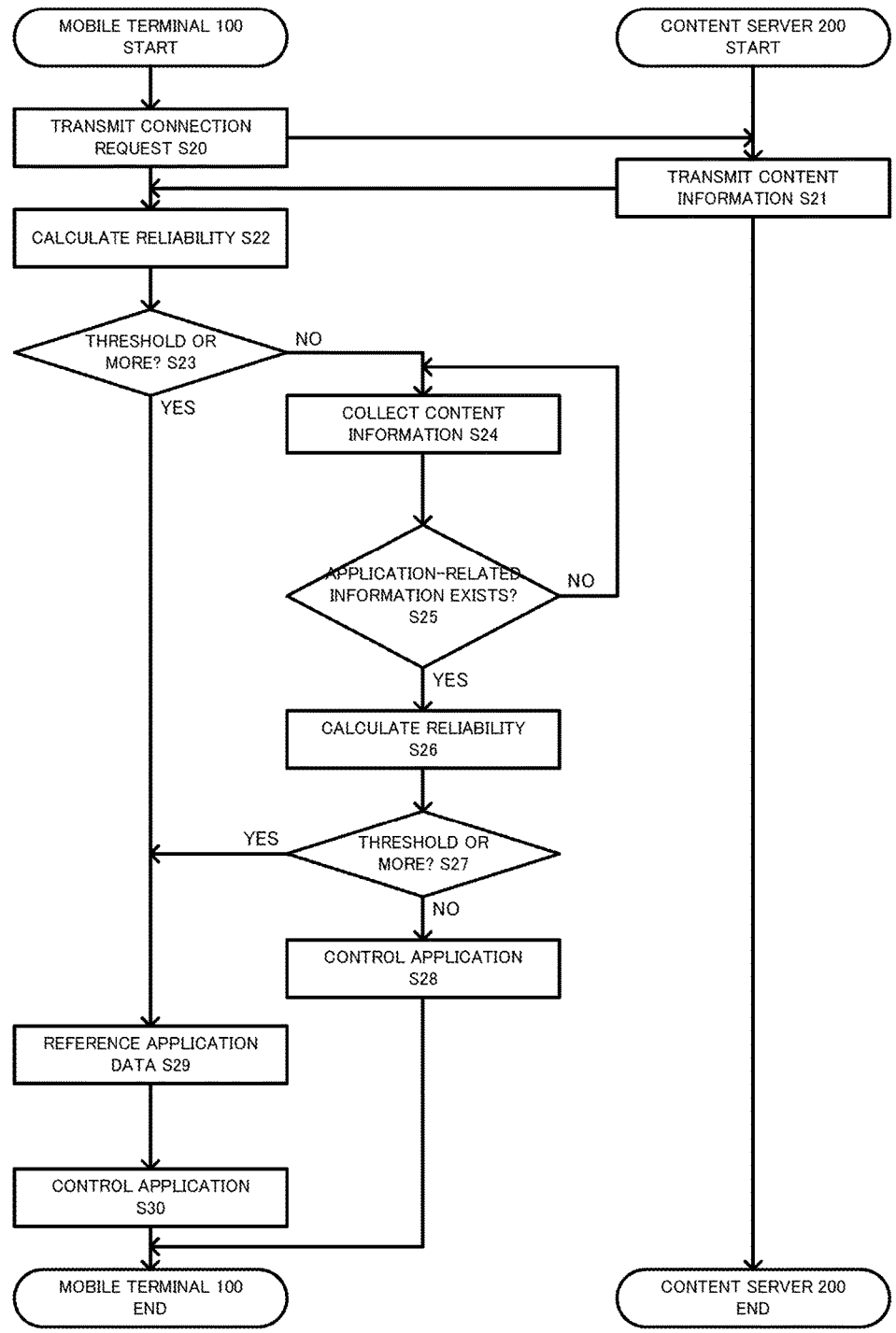
FIG. 9 is a flow chart of the terminal management process performed by the mobile terminal 100 and the content server 200 in the first embodiment.

FIG. 9 is a functional block diagram of the terminal management process performed by the mobile terminal 100 and the content server 200. The tasks executed by the modules of the above-mentioned devices are explained below together with this process.

First, the connection module 150 transmits a connection request to the content server 200 to perform data communication with the content server 200 (step S20). In the step S20, the connection module 150 transmits a connection request to connect to a WEB content containing information on an application running on the mobile terminal 100.

The connection request receiving module 240 receives the connection request transmitted from the mobile terminal 100. The content providing module 241 transmits information on the WEB content containing information on its own application to the mobile terminal 100 as content information (step S21). In the step S21, the content information includes a provider name, a URL, a description, and other information on the WEB content.

The connection module 150 receives the content information transmitted from the content server 200. The reliability calculation module 160 calculates reliability of the received content information (step S22). In the step S22, the reliability calculation module 160 calculates the reliability based on the received content information and the reliability table to be described below.

Reliability Table

Figure 11:
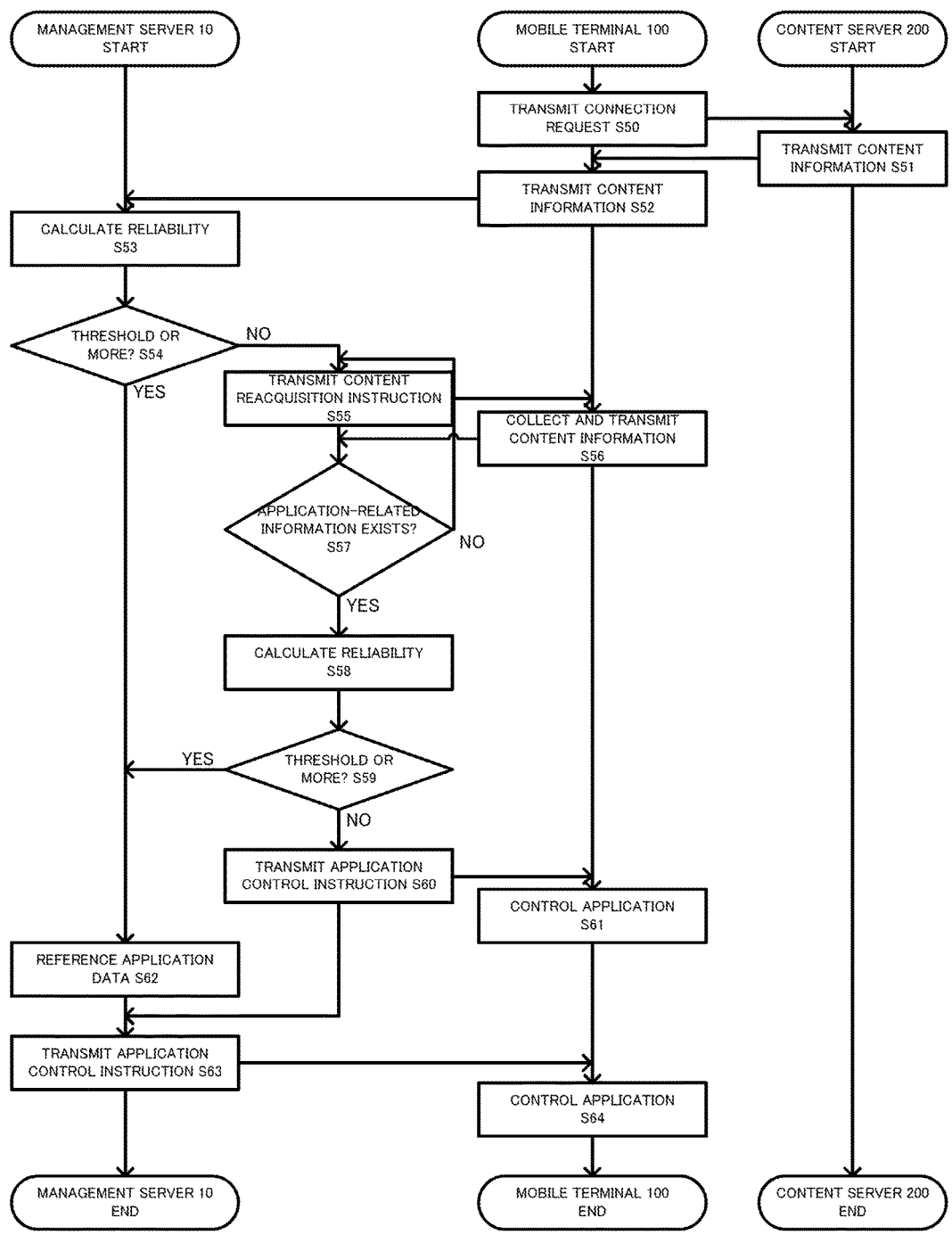
FIG. 11 is a flow chart of the terminal management process performed by the management server 10, the mobile terminal 100, and the content server 200 in the second embodiment.

FIG. 13 shows the reliability table stored by the table storing module 161. The table storing module 161 stores reliable content information. In FIG. 11, the table storing module 161 stores a plurality of provider names and a plurality of URLs. The table storing module 161 may store other provider names, other URLs, or other descriptions. Moreover, the table storing module 161 may store reliability tables containing only provider names, URLs, and descriptions, respectively. The table storing module 161 may acquire and store reliable content information from other servers and the Internet or from user's direct input.

In the step S22, the reliability calculation module 160 searches the reliability table with a provider name and a URL contained in the received content information and judges whether or not the provider name and the URL exist in the reliability table. If judging that the provider name exists in the reliability table, the reliability calculation module 160 increments the reliability by 1. If judging that the URL exists in the reliability table, the reliability calculation module 160 increments the reliability by 1. If judging that the provider name does not exist in the reliability table, the reliability calculation module 160 does not increment the reliability. If judging that the URL does not exist in the reliability table, the reliability calculation module 160 does not increment the reliability The reliability judgement module 162 judges whether or not the total reliability calculated in the step S22 is a threshold or more (step S23). If the reliability judgement module 162 judges that the total reliability is not a predetermined threshold or more (NO) in the step S23, the connection module 150 collects content information different from the content information transmitted from the content server 200 in the step S21 (step S24). For example, the connection module 150 collects the WEB content of a different URL and a different provider name in the step S24.

The content checking module 151 checks whether or not information on the above-mentioned application is contained in the content information collected in the step S24 (step S25). In the step S25, the content checking module 151 judges whether or not application-related information such as the name, the identifier, the producer, or the provider of the application is contained. In the step S25, if the content checking module 151 judges that application-related information is not contained (NO), the connection module 150 acquires another WEB content from the content server 200.

On the other hand, if the content checking module 151 judges that application-related information is contained (YES) in the step S25, the reliability calculation module 160 calculates the reliability in the same way as the step S22 (step S26). In the step S26, the reliability calculation module 160 judges how much amount of content information when the reliability is calculated in the step S22 is contained in the application-related information and calculates the reliability. For example, if the number of the same items contained in content information as those in the application-related information is a predetermined number or more, the reliability calculation module 160 increments the reliability. If the number of the same items is less than a predetermined number, the reliability calculation module 160 decrements the reliability. Specifically, if the name, the producer, and the provider of the application contained in content information are the same as those in the application-related information, the reliability calculation module 160 increments the reliability. If only the name of the application in content information is the same as that in the application-related information, the reliability calculation module 160 decrements the reliability. The number of same items can be changed as needed.

The reliability judgement module 162 judges whether or not the total reliability calculated in the step S26 is a predetermined threshold or more (step S27). In the step S27, if judging that the total reliability is not a predetermined threshold or more (NO), the reliability judgement module 162 judges that the WEB content is inappropriate. Then, the application control module 153 performs control of the application (step S28). In the step S28, the application control module 153 performs control to make the application unavailable, such as stop downloading, and start and uninstallation of the application based on the content information on this WEB content and to remove the application from a subject for the control.

If the reliability judgement module 162 judges that the reliability is a threshold or more (YES) in the step S23 or S27, the content reference module 152 references data on an application in the WEB content (step S29). In the step S29, the content reference module 152 reference data on control of the application, such as download, installation, update, start-up, and uninstallation of the application.

The application control module 153 performs control of the application for the mobile terminal 100 based on a result of the reference in the step S29 (step S30). In the step 30, the application control module 153 references a reliable application list contained in the referenced data to perform download or installation control of this application. The application control module 153 also references an unreliable application list contained in the referenced data to perform uninstallation control of this application. Moreover, the application control module 153 performs analysis of the characters and the images contained in the WEB content as data on the application in the WEB content and references key words such as an application name, "malware has been found", and "malware invades" to control start-up or stop of the application.

Update Management Process in First Embodiment

Figure 10:
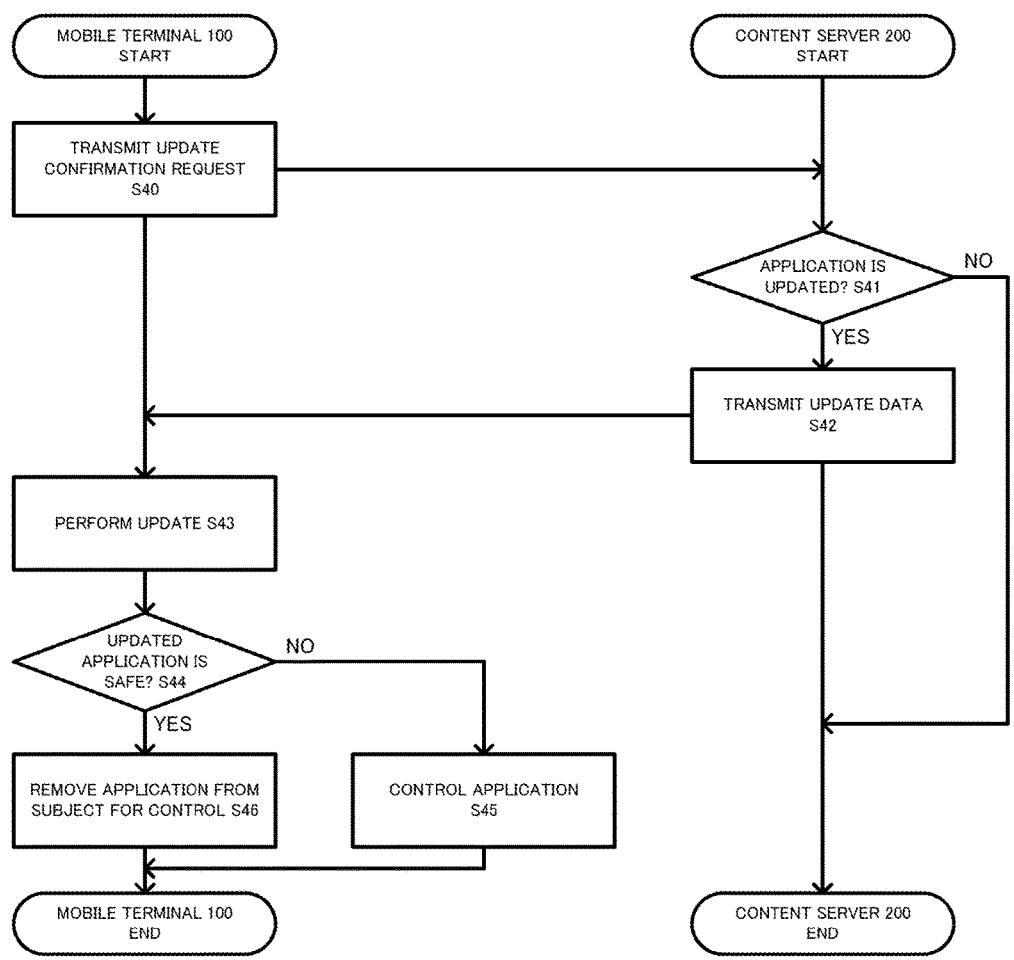
FIG. 10 is a flow chart of the update management process performed by the mobile terminal 100 and the content server 200 in the first embodiment.

FIG. 10 is a functional block diagram of the update management process performed by the mobile terminal 100 and the content server 200 in the first embodiment. The tasks executed by the modules of the above-mentioned devices are explained below together with this process. The process may be performed at any timing whenever a user desires, at predetermined intervals, or at other timing.

The content acquisition module 154 transmits an update confirmation request to the content server 200 to confirm whether or not the installed application is updated (step S40).

The update confirmation request receiving module 242 receives the update confirmation request transmitted from the mobile terminal 100. The update judgment module 250 judges whether or not the application installed in the mobile terminal 100 is updated, based on the received update confirmation request (step S41). In the step S41, if judging that the application is not updated (NO), the update judgment module 250 ends this process.

On the other hand, if the update judgment module 250 judges that the application is updated (YES) in the step S41, the content providing module 241 transmits update data necessary for the update to the mobile terminal 100 (step S42).

The content acquisition module 154 receives the update data transmitted from the content server 200. The application control module 153 performs update of the application based on the received update data (step S43).

The content confirmation module 155 judges whether or not the application updated this time is safe (step S44). In the step S44, the content confirmation module 155 judges whether or not the above-mentioned reliability of this application is a threshold or more. If the content confirmation module 155 judges that the reliability is not a threshold or more and that the application updated this time is not safe (NO) in the step S44, the application control module 153 performs uninstallation, start-up and stop, and other controls of this application (step S45).

On the other hand, if the content confirmation module 155 judges that the reliability is a threshold or more and that the application updated this time is safe (YES) in the step S44, the application control removal module 163 removes this application from a subject for the control (step S46). In the step S46, the control removal module 163 does not perform controls such as download, installation, start-up, stop, and uninstallation controls for the application that is judged to be safe.

The second embodiment will be explained below. The reference signs in the first embodiment are assigned to the same components as those of the first embodiment. The detailed explanation of the components is omitted.

Figure 6:
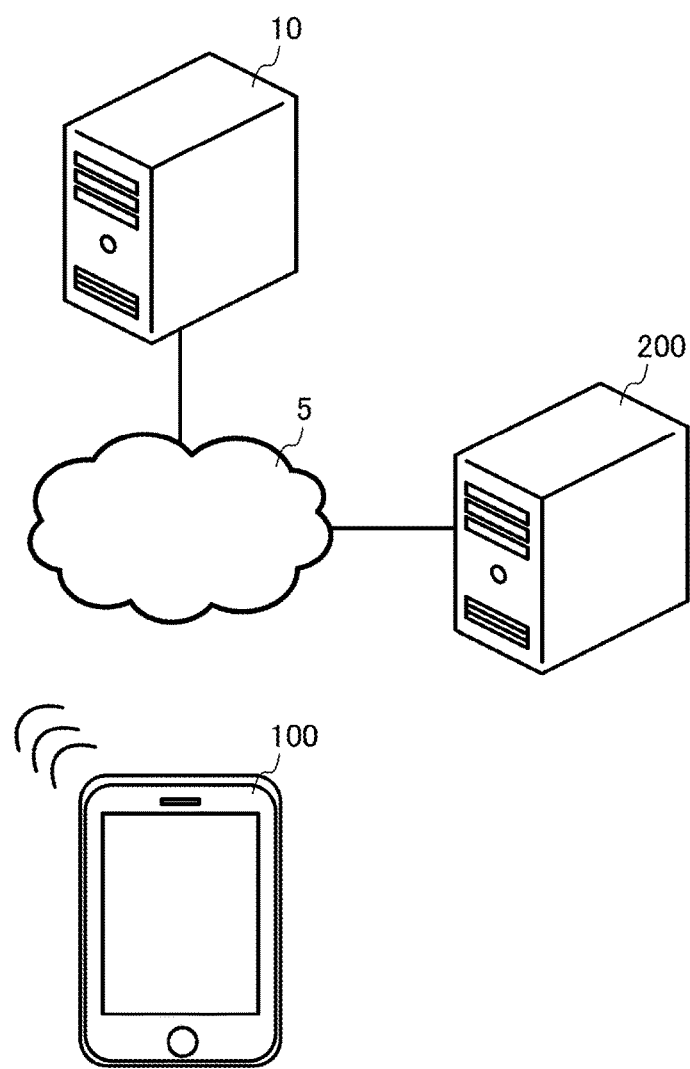
FIG. 6 is an overall configuration diagram of the system for managing a terminal 1 according to the second embodiment.

System Configuration of System for Managing Terminal 1 According to Second Embodiment FIG. 6 shows the system configuration of the system for managing a terminal 1 according to the second embodiment of the present invention. The system for managing a terminal 1 includes a management server 10, a terminal 100, a content server 200, and a public line network 5 (e.g. the Internet network, a third and a fourth generation networks).

The management server 10 is a server device with a data communication function and functions to be described later.

The mobile terminal 100 has functions to be described later, which is an electrical appliance or an information appliance similar to those in the first embodiment.

The content server 200 is a server device similar to that in the first embodiment.

Functions

Figure 8:
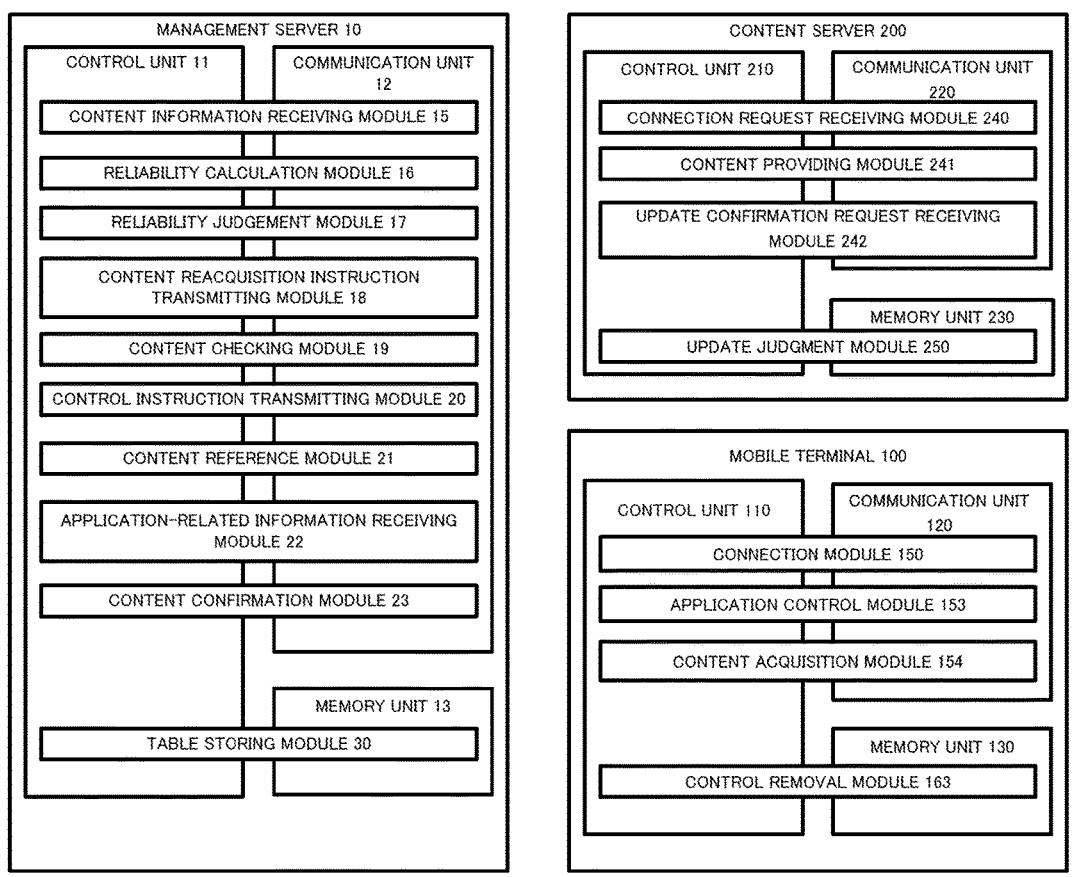
FIG. 8 is a functional block diagram of the management server 10, the mobile terminal 100, and the content server 200 in the second embodiment.

The structure of each device will be described below with reference to FIG. 8.

The management server 10 includes a control unit 11 including a CPU, a RAM, and a ROM; and a communication unit 12 including a Wireless Fidelity or Wi-Fi® enabled device complying with, for example, IEEE 802.11 enabling the communication with other devices in the same way as the content server 200 in the first embodiment.

The management server 10 also includes a storage unit as the memory unit 13 in the same way as the content server 200 in the first embodiment. The memory unit 13 includes the above-mentioned reliability database.

In the management server 10, the control unit 11 reads a predetermined program to run a content information receiving module 15, a reliability calculation module 16, a reliability judgement module 17, a content reacquisition instruction transmitting module 18, a content checking module 19, a control instruction transmitting module 20, a content reference module 21, an application-related information receiving module 22, and a content confirmation module 23 in cooperation with the communication unit 12.

Furthermore, in the management server 10, the control unit 11 reads a predetermined program to run a table storing module 30 in cooperation with the memory unit 13.

The mobile terminal 100 includes a control unit 110 including a CPU, a RAM, and a ROM; and a communication unit 120 including a Wireless Fidelity or Wi-Fi® enabled device complying with, for example, IEEE 802.11 enabling the communication with other devices in the same way as the first embodiment.

The mobile terminal 100 also includes a storage unit as the memory unit 130 in the same way as the first embodiment. The mobile terminal 100 also includes an input-output unit including a display unit and an input unit. Furthermore, the mobile terminal 100 has a device capable of acquiring location information.

In the mobile terminal 100, the control unit 110 reads a predetermined program to run a connection module 150, an application control module 153, and a content acquisition module 154 in cooperation with the communication unit 120. Furthermore, in the mobile terminal 100, the control unit 110 reads a predetermined program to run a control removal module 163 in cooperation with the memory unit 130.

The content server 200 includes a control unit 210 including a CPU, a RAM, and a ROM; and a communication unit 220 including a Wireless Fidelity or Wi-Fi® enabled device complying with, for example, IEEE 802.11 enabling the communication with other devices in the same way as the first embodiment.

The content server 200 also includes a storage unit as the memory unit 230 in the same way as the first embodiment.

In the content server 200, a control unit 210 reads a predetermined program to run a connection request receiving module 240, a content providing module 241, and an update confirmation request receiving module 242 in cooperation with a communication unit 220. In the content server 200, the control unit 210 reads a predetermined program to run an update judgment module 250 in cooperation with the memory unit 230.

Terminal Management Process in Second Embodiment

FIG. 11 is a functional block diagram of the terminal management process performed by the management server 10, the mobile terminal 100, and the content server 200. The tasks executed by the modules of the above-mentioned devices are explained below together with this process.

First, the connection module 150 transmits a connection request to the content server 200 to perform data communication with the content server 200 (step S50). In the step S50, the connection module 150 transmits a connection request to connect to a WEB content containing information on an application running on the mobile terminal 100.

The connection request receiving module 240 receives the connection request transmitted from the mobile terminal 100. The content providing module 241 transmits information on the WEB content containing information on its own application to the mobile terminal 100 as content information (step S51).

In the step S51, the content information includes a provider name, a URL, a description, and other information on the WEB content.

The connection module 150 receives the content information transmitted from the content server 200. The connection module 150 transmits the received content information to the management server 10 (step S52).

The content information receiving module 15 receives the content information transmitted from the mobile terminal 100. The reliability calculation module 16 calculates reliability of the received content information (step S53). In the step S53, the reliability calculation module 16 calculates the reliability based on the received content information and the above-mentioned reliability table stored by the table storing module 30.

In the step S53, the reliability calculation module 16 searches the reliability table with a provider name and a URL contained in the received content information and judges whether or not the provider name and the URL exist in the reliability table. If judging that the provider name exists in the reliability table, the reliability calculation module 16 increments the reliability by 1. If judging that the URL exists in the reliability table, the reliability calculation module 16 increments the reliability by 1. If judging that the provider name does not exist in the reliability table, the reliability calculation module 16 does not increment the reliability. If judging that the URL does not exist in the reliability table, the reliability calculation module 16 does not increment the reliability The reliability judgement module 17 judges whether or not the total reliability calculated in the step S53 is a threshold or more (step S54). If the reliability judgement module 17 judges that the total reliability is not a predetermined threshold or more (NO) in the step S54, the content reacquisition instruction transmitting module 18 transmits a content reacquisition instruction to the mobile terminal 100 to acquire content information different from the content information that the mobile terminal received in the step S51 (step S55). The different content information is the WEB content of a different URL or provider name.

The connection module 150 collects content information different from the content information that the mobile terminal 100 received in the step S51 when receiving the instruction from the management server 10, and transmits the collected content information to the management server 10 (step S56).

The content information receiving module 15 receives the content information transmitted from the mobile terminal 100. The content checking module 19 checks whether or not information on the above-mentioned application is contained in the content information received in the step S56 (step S57). In the step S57, the content checking module 19 judges whether or not application-related information such as the name, the identifier, the producer, or the provider of the application is contained. In the step S57, if the content checking module 19 judges that application-related information is not contained (NO), the content reacquisition instruction transmitting module 18 transmits a content reacquisition instruction to the mobile terminal 100.

On the other hand, if the content checking module 19 judges that application-related information is contained (YES) in the step S57, the reliability calculation module 160 calculates the reliability in the same way as the step S53 (step S58). In the step S58, the reliability calculation module 16 judges how much amount of content information when the reliability is calculated in the step S53 is contained in the application-related information and calculates the reliability. For example, if the number of the same items contained in content information as those in the application-related information is a predetermined number or more, the reliability calculation module 16 increments the reliability. If the number of the same items is less than a predetermined number, the reliability calculation module 16 decrements the reliability. Specifically, if the name, the producer, and the provider of the application contained in content information are the same as those in the application-related information, the reliability calculation module 16 increments the reliability. If only the name of the application in content information is the same as that in the application-related information, the reliability calculation module 16 decrements the reliability. The number of same items can be changed as needed.

The reliability judgement module 17 judges whether or not the total reliability calculated in the step S58 is a threshold or more (step S59). If judging that the total reliability is not a predetermined threshold or more (NO) in the step S59, the reliability judgement module 17 judges that the WEB content is inappropriate. The control instruction transmitting module 20 transmits an application control instruction to the mobile terminal 100 to perform control of the application (step S60). In the step S50, the application control instruction instructs the mobile terminal 100 to perform control to make the application unavailable, such as stop downloading, and start and uninstallation of the application and to remove the application from a subject for the control.

The application control module 153 receives the application control instruction transmitted from the management server 10 and performs control of the application based on the application control instruction (step S61).

If the reliability judgement module 17 judges that the reliability is a threshold or more (YES) in the step S54 or S59, the content reference module 21 references data on an application in the WEB content (step S62). In the step S52, the content reference module 21 reference data on control of the application, such as download, installation, update, start-up, and uninstallation of the application.

The control instruction transmitting module 20 transmits an application control instruction to the mobile terminal 100 based on a result of the reference in the step S62 (step S63). In the step S63, the application control instruction instructs the mobile terminal 100 to reference a reliable application list contained in the referenced data and to perform download or installation control of this application. The application control instruction also instructs the mobile terminal 100 to reference an unreliable application list contained in the referenced data and to perform uninstallation control of this application. Moreover, the application control instruction also instructs to perform analysis of the characters and the images contained in the WEB content as data on the application in the WEB content and to reference key words such as an application name, "malware has been found", and "malware invades" to control start-up or stop of the application.

The connection module 150 receives the application control instruction transmitted from the management server 10. The application control module 153 performs control of the application based on the application control instruction transmitted from the management server 10 (step S64).

Update Management Process in Second Embodiment

Figure 12:
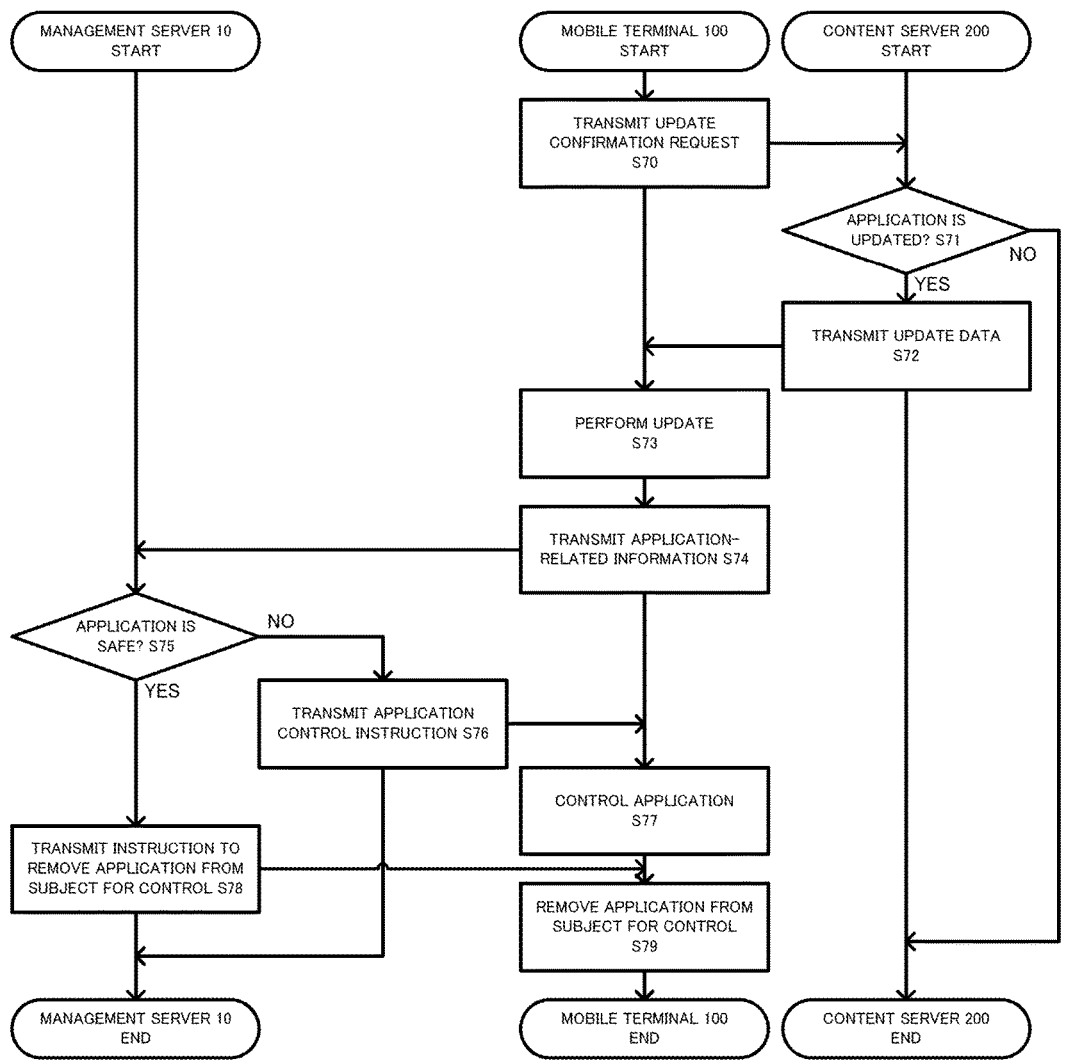
FIG. 12 is a flow chart of the terminal management process performed by the management server 10, the mobile terminal 100, and the content server 200 in the second embodiment.

FIG. 12 is a functional block diagram of the terminal management process performed by the management server 10, the mobile terminal 100, and the content server 200 in the second embodiment. The tasks executed by the modules of the above-mentioned devices are explained below together with this process. The process may be performed at any timing whenever a user desires, at predetermined intervals, or at other timing.

The content acquisition module 154 transmits an update confirmation request to the content server 200 to confirm whether or not the installed application is updated (step S70).

The update confirmation request receiving module 242 receives the update confirmation request transmitted from the mobile terminal 100. The update judgment module 250 judges whether or not the application installed in the mobile terminal 100 is updated, based on the received update confirmation request (step S71). In the step S71, if judging that the application is not updated (NO), the update judgment module 250 ends this process.

On the other hand, if the update judgment module 250 judges that the application is updated (YES) in the step S71, the content providing module 241 transmits update data necessary for the update to the mobile terminal 100 (step S72).

The content acquisition module 154 receives the update data transmitted from the content server 200. The application control module 153 performs update of the application based on the received update data (step S73).

The connection module 150 transmits application-related information on the application updated this time to the management server 10 (step S74).

The application-related information receiving module 22 receives the application-related information transmitted from the mobile terminal 100. The content confirmation module 23 judges whether or not the application updated this time by the mobile terminal 100 is safe, based on the received application-related information (step S75). In the step S75, the content confirmation module 23 judges whether or not the above-mentioned reliability of this application is a threshold or more. If the content confirmation module 23 judges that the reliability is not a threshold or more and that the application updated this time is not safe (NO) in the step S75, the control instruction transmitting module 20 transmits an instruction of uninstallation, start-up and stop, and other controls of this application as control instruction to the mobile terminal 100 (step S76).

The connection module 150 receives the control instruction transmitted from the management server 10. The application control module 153 performs control of the application based on the received control instruction (step S77).

On the other hand, if the content confirmation module 23 judges that the reliability is a threshold or more and that the application updated this time is safe (YES) in the step S75, the control instruction transmitting module 20 transmits a control instruction to the mobile terminal 100 to remove this application from a subject for the control (step S78). In the step S78, the control instruction transmitting module 20 transmits a control instruction not to perform controls such as download, installation, start-up, stop, and uninstallation controls for the application that is judged to be safe.

The connection module 150 receives the control instruction transmitted from the management server 10. The control removal module 163 removes the application from a subject for the control based on the received control instruction (step S79).

To achieve the means and the functions that are described above, a computer (including CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 System for managing terminal
10 Management server
100 Mobile terminal
200 Content server

What is claimed is:

1. A system for managing a terminal, comprising:
at least one processor that:
   connects to a WEB content containing information on an application running on the terminal;
   calculates reliability of the WEB content based on whether a provider name of the WEB content is stored in a reliability table and whether a URL of the WEB content is stored in the reliability table, the reliability table previously storing a plurality of provider names and a plurality of URLs as reliable content information;
   references data on an application in the WEB content when the calculated reliability exceeds a threshold; and
   performs control of the application for the terminal based on a result of the reference,
wherein the calculation unit increments the reliability when the provider name is stored in the reliability table and increments the reliability when the URL is stored in the reliability table.

2. The system according to claim 1, wherein the at least one processor performs download control of the application.

3. The system according to claim 1, wherein the at least one processor performs installation control of the application.

4. The system according to claim 1, wherein the at least one processor performs start-up control of the application.

5. The system according to claim 1, wherein the at least one processor uninstalls the application.

6. The system according to claim 1, wherein the at least one processor:
   confirms whether or not the application is safe when the application is updated; and
   removes the application from a subject for the control when the safety is not confirmed.

7. The system according to claim 1, wherein the at least one processor:
   collects information from a plurality of the connected WEB contents; and
   checks whether or not the collected information includes information on a same application.

8. A method for managing a terminal, comprising the steps of:
   connecting to a WEB content containing information on an application running on the terminal;
   calculating reliability of the WEB content based on whether a provider name of the WEB content is stored in a reliability table and whether a URL of the WEB content is stored in the reliability table, the reliability table previously storing a plurality of provider names and a plurality of URLs as reliable content information;
   referencing data on an application in the WEB content when the calculated reliability exceeds a threshold; and
   performing control of the application for the terminal based on a result of the reference,
wherein the reliability is incremented when the provider name is stored in the reliability table and the reliability is incremented when the URL is stored in the reliability table.

* * * * *